A. H. PARKER.
HEATING FURNACE.
APPLICATION FILED JULY 9, 1918.
1,325,905.
Patented Dec. 23, 1919.
2 SHEETS—SHEET 1.
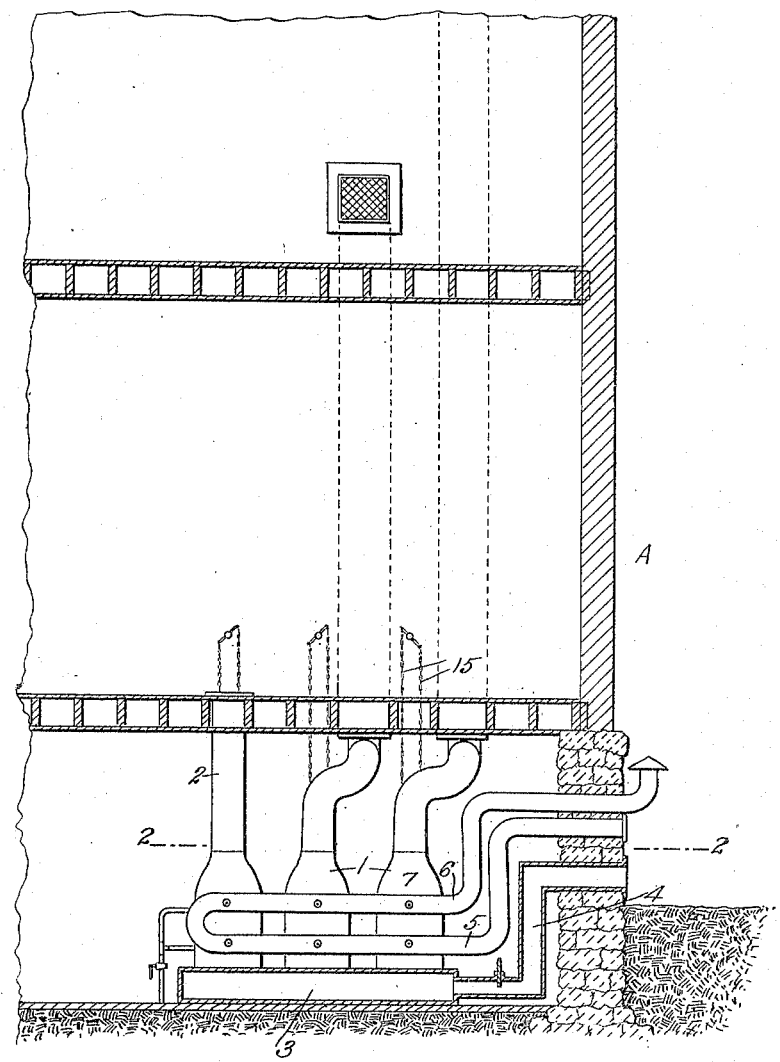
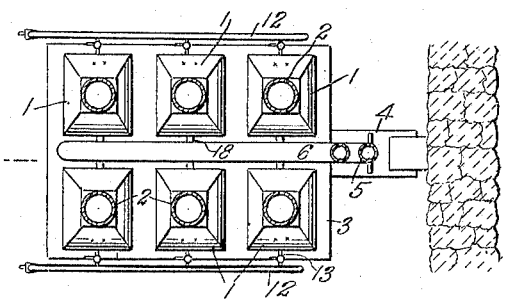
WITNESSES
H. T. Walker
C. Bradway
INVENTOR
Alice H. Parker
BY
ATTORNEYS A. H. PARKER.
HEATING FURNACE.
APPLICATION FILED JULY 9, 1918.
1,325,905.
Patented Dec. 23, 1919.
2 SHEETS—SHEET 2.
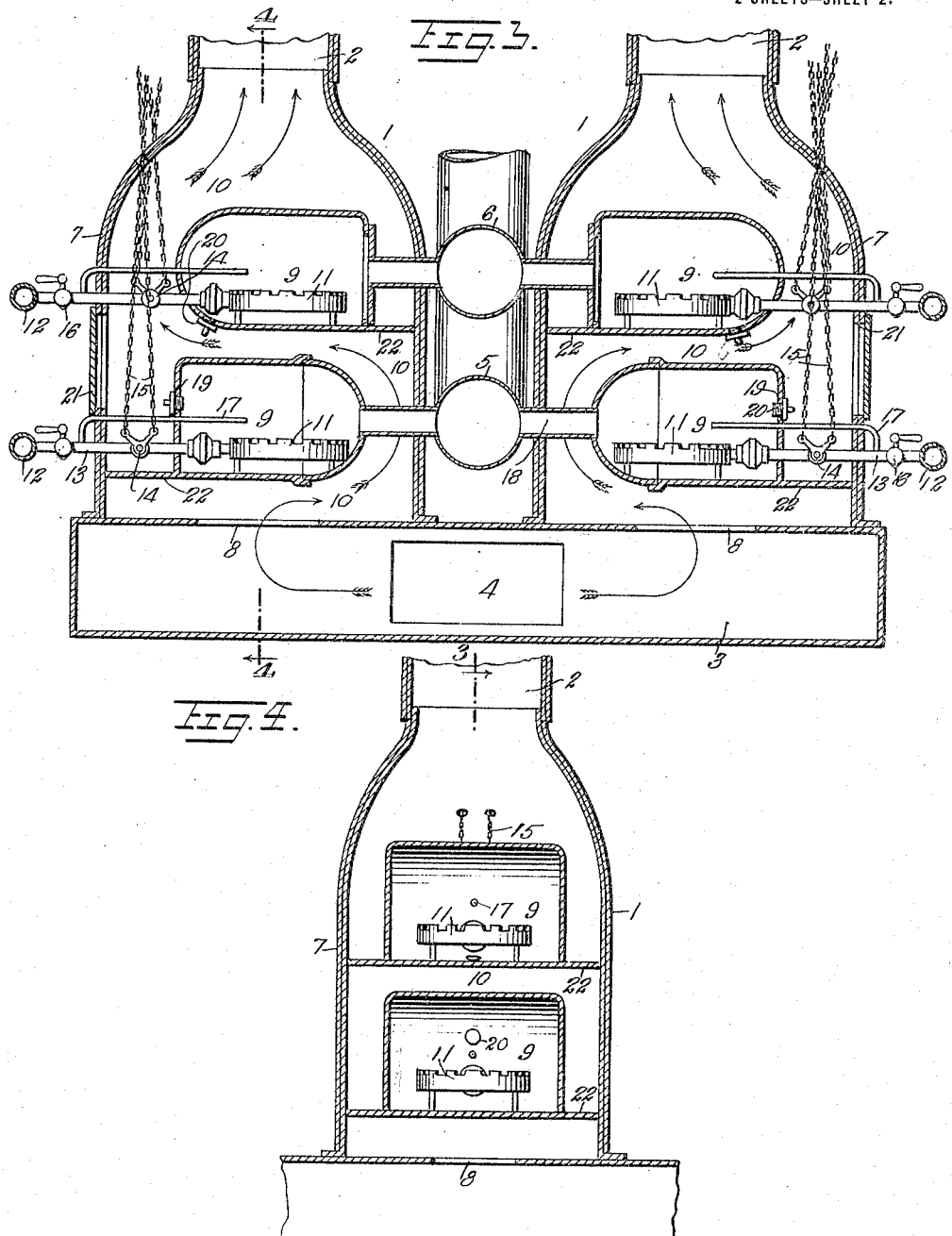
WITNESSES
H. J. Walker
C. Bradway
INVENTOR
Alice H. Parker
BY
ATTORNEYS

UNITED STATES PATENT OFFICE.

ALICE H. PARKER, OF MORRISTOWN, NEW JERSEY.

HEATING-FURNACE.

1,325,905.     Specification of Letters Patent.     Patented Dec. 23, 1919.

Application filed July 9, 1918. Serial No. 244,080.

*To all whom it may concern:*

Be it known that I, ALICE H. PARKER, a citizen of the United States, and a resident of Morristown, in the county of Morris and State of New Jersey, have invented a new and Improved Heating-Furnace, of which the following is a full, clear, and exact description.

This invention relates to heating furnaces for houses or other buildings, and it has for its general objects to provide a comparatively simple, reliable and efficient heating furnace in which gas is employed for the fuel, whereby economy of labor and fuel cost is effected and greater flexibility in the operation obtained.

A more specific object of the invention is the provision of a heating furnace which embodies a plurality of heating units independently controlled which are supplied from a common cold air box and which have individual hot air ducts leading to different parts of the building, so that heating of the various rooms or floors can be regulated as required.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a sectional view of a building showing a heating furnace installed therein, the section being taken on the line 1—1, Fig. 2;

Fig. 2 is a horizontal section on the line 2—2, Fig. 1;

Fig. 3 is a vertical section on the line 3—3, Fig. 4; and

Fig. 4 is a vertical section on the line 4—4, Fig. 3.

Referring to the drawings, 1 designates the various heating units of the furnace, each of which is provided with a hot air flue or duct 2, and the units are supplied with fresh air through a cold air box 3 that is connected through a pipe 4 with the atmosphere. The combustion or burner chambers of the units are connected with pipes 5 and 6 for carrying off the products of combustion. The furnace may be located in the basement of the building A and the flues 2 lead to the various rooms or floors.

Each heating unit 1 comprises a casing 7 which has an opening 8 at its bottom through which air passes from the box 3. In the casing 7 are a plurality of combustion or burner chambers 9 located one above another and in spaced relation so as to form a passage 10 for the flow of the air to be heated. Each combustion chamber 9 contains a gas burner 11 connected with a gas manifold 12 by a pipe 13 which has a regulating valve 14 operated by pull chains 15 from a point remote from the furnace, and the branch 13 may also have a stop cock 16 located outside the casing. From the branch 13 leads a small pipe 17 that terminates within the chamber 9 so as to constitute a pilot burner which will light the main burner 11 as soon as the gas to the same is turned on. Each chamber 9 has a connection 18 with the pipe 5 or 6 so that the products of combustion can flow off from the chamber 9. Access to the pilot burner is had through an opening 19 normally closed by a screw cover 20. Each unit has at its front a door 21 for permitting access to the interior. The combustion chambers are separated from the walls of the casing 7 so that air can circulate entirely around the combustion chambers to be heated thereby, and to cause the air to follow a serpentine course a baffle plate 22 is provided at the bottom of each unit but alternately at opposite sides, which arrangement produces a more effective heating of the air. As each unit has a plurality of burners the temperature can be regulated to a nicety, since one or more burners may be used, according to the heat required, and since the furnace is made up of units the heating capacity can be varied. For instance, if certain rooms or floors are not required to be heated the units connected therewith can be cut out of service and only those units kept burning which lead to the rooms where heat is required.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A heating furnace comprising a plurality of casings, means for supplying cold air to said casings at the bottom, an air duct connected with the top of each of said casings for distributing hot air from the casings, a pair of heating chambers arranged one above the other inside each of said casings, each heating chamber having a domed end and a square end, a gas heater arranged in each of said chambers, a valve for each of said heaters for controlling the gas supplied to the heaters, means for guiding the products of combustion from said chambers, and means acting as extensions projecting from the bottoms of each of said chambers, said extensions meeting the casings at opposite sides so as to provide a tortuous path for the air to follow between the heating chambers as it passes from the air supplying means to said duct.

2. A heating furnace of the class described comprising a plurality of casings, a hot air distributing duct connected to the upper part of each of the casings, a cold air supply duct below each of said casings and in communication therewith, a pair of super-imposed closed chambers arranged in each of said casings, a gas heater arranged in each of said closed chambers, a gas supply connected to each gas heater, a pipe for a pilot light arranged with an open end above each gas heater, means for controlling the quantity of gas supplied to the respective heaters, a discharge pipe for the products of combustion arranged in the end of each closed chamber opposite the end through which the gas is supplied, and extensions projecting from the bottoms of each of said closed chambers, said extensions meeting the casing at opposite sides so as to provide baffles for the incoming air as it passes from the cold air supply chamber to said hot air distributing duct.

ALICE H. PARKER.